(No Model.)

I. KEY.
CHURN.

No. 491,055. Patented Jan. 31, 1893.

Witnesses

Inventor
Isaac Key
By his Attorney

United States Patent Office.

ISAAC KEY, OF WINAMAC, INDIANA, ASSIGNOR OF ONE-HALF TO OLIVER CAPRON AND JEREMIAH HAHN, OF SAME PLACE.

CHURN.

SPECIFICATION forming part of Letters Patent No. 491,055, dated January 31, 1893.

Application filed February 27, 1892. Serial No. 423,002. (No model.)

*To all whom it may concern:*

Be it known that I, ISAAC KEY, a citizen of the United States, residing at Winamac, in the county of Pulaski and State of Indiana, have invented certain new and useful Improvements in Churns; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in churns and has for its object to secure the expeditious churning of the cream, to provide for the ready cleaning of the cream receptacle and promote simplicity and cheapness, and to these ends my invention consists in the novel construction of the parts substantially as hereinafter more fully disclosed and pointed out in the claim.

Figure 1:
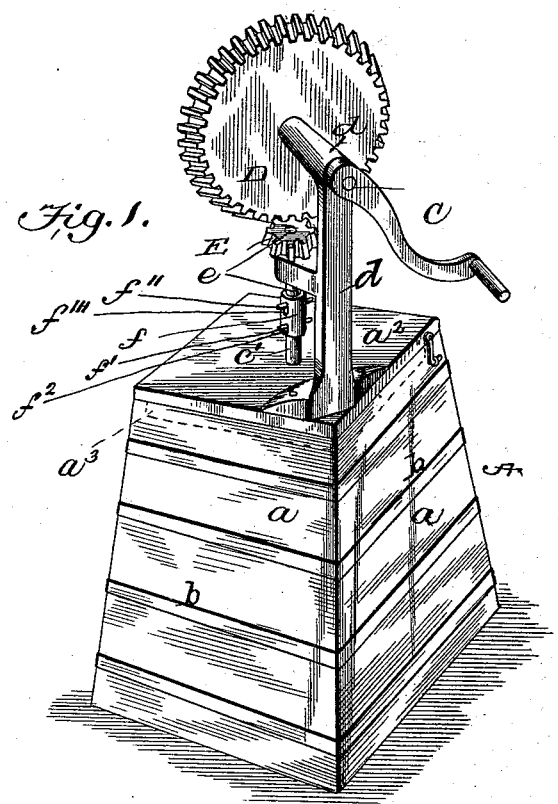
Figure 2:
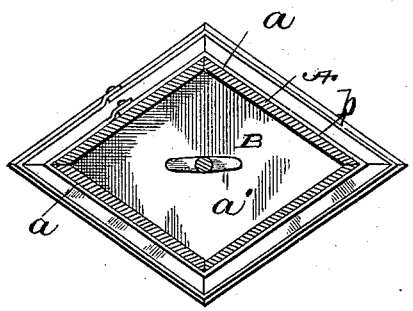
Figure 3:
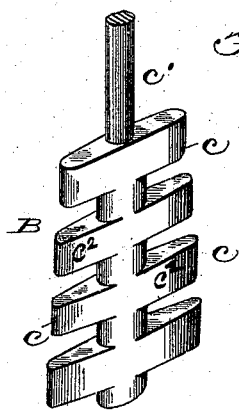

In the accompanying drawings—Figure 1 is a perspective view of my improved churn. Fig. 2 is a cross section thereof and Fig. 3 is a detached perspective view of the dasher.

In the organization of my invention, I construct the cream-receptacle A, in its general outline, diamond-shape, in cross-section, tapering it toward its upper or top end, it being preferably made of four "staves" or sections $a\,a$, jointed or joined together at the center and ends of the receptacle and converging toward their upper ends, and of a bottom $a'$ and cover $a^2$. These sections or staves, with the bottom let into them near their bottom-edges or ends after the fashion, somewhat, of putting or securing into position the bottom of a tub, are firmly bound together water-tight at the joints by, preferably, four iron-hoops $b$, encompassing or placed around the same at suitable intervals. Thus, by this form of construction of receptacle, flaring toward or at its sides and tapering toward or at both its ends and toward the top, the cream, as it is agitated by the dasher, will, in striking the walls or sections of the receptacle thus presented to advantage to the agitated cream or overhanging it be deflected or thrown back upon the dasher, providing for the thorough breaking of the globules and the perfect and expeditious churning of the cream.

The cover $a^2$ has an undercut outer edge $a^3$ providing it with a flange thereat resting upon the top edge or end of the receptacle A and with its lesser area or surface fitting into the opening at the said top edge or end, thus rendering the joint between the cover and receptacle water-tight or proof against the splashing out thereat of the agitated cream or contents of the receptacle.

B is the dasher with its blades $c$ and staff or shaft $c'$ integral or in one piece, said blades forming lateral, aligning rectangular flat-pieces $c^2\,c^2$ spaced short intervals apart and increasing in length successively toward the bottom to correspondingly act upon the cream, and yet not be of such length as to come in contact with the sides of the receptacle.

C is a suitably handled or cranked shaft supported or journaled in the bracket or support $d$ having its foot or base screwed or otherwise secured upon the cover $a^2$. This shaft carries a beveled gear-wheel D geared to a horizontal beveled pinion E whose shaft $e$ is also journaled in the bracket or support $d$; and upon this shaft $e$ is carried a sliding sleeve $f$ having opposite slots $f'''$ engaged by a transverse pin $f''$ on the said shaft $e$, permitting the vertical adjustment or sliding of the sleeve upon the latter. The sliding or vertically adjustable sleeve $f$ has indenting its lower or bottom edge, opposite open-ended slots $f^2$ adapted to receive or engage a transverse pin $f'$ on the dasher-shaft $c'$, whereby a coupling is effected between the shafts $e$ and $c'$ capable of permitting the same to be readily coupled and uncoupled as may be required in putting the dasher in, and out, of operation and in removing the dasher from the churn-receptacle.

Of course by turning the cranked or handled shaft C the dasher is operated and the churning operation performed.

Having thus fully described my invention what I claim and desire to secure by Letters Patent is—

The churn consisting of the cream receptacle or body of an approximately pyramidal shape, the dasher having the cross-bars or beaters successively varying in length and having its staff or shaft provided at the upper end with a cross-pin, and the driving mechanism, the shaft of a pinion of which carries a vertically adjustable or sliding sleeve adapted to engage said cross-pin of the dasher shaft, substantially as set forth.

In testimony whereof I affix my signature in presence of two witnesses.

ISAAC KEY.

Witnesses:
O. S. RUSSELL,
EVLYN VIRDEN.